United States Patent
King et al.

(10) Patent No.: US 6,396,918 B1
(45) Date of Patent: May 28, 2002

(54) METHOD FOR FORWARDING A CALL TO A TELEPHONE BEHIND A KEY TELEPHONE SYSTEM

(75) Inventors: Neal J. King, Oakland, CA (US); Joseph L. Budziak, Boca Raton, FL (US); Henry Shih Chuan Wu, Fremont, CA (US); Christoph A. Aktas, Sunnyvale, CA (US); Michael Sassin; Naser Sheikhzadegan, both of San Jose, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/234,141

(22) Filed: Jan. 19, 1999

(51) Int. Cl.[7] .................................................. H04M 3/42
(52) U.S. Cl. .............................. 379/211.02; 379/212.01
(58) Field of Search ....................... 379/211.02, 207.02, 379/207.13, 207.14, 212.01, 207.15

(56) References Cited

U.S. PATENT DOCUMENTS

| 4,602,132 A | 7/1986 | Nagatomi et al. |
|---|---|---|
| 4,850,011 A | 7/1989 | Delmege et al. |
| 4,893,310 A | 1/1990 | Robertson et al. |
| 4,905,274 A | 2/1990 | Cooper et al. |
| 4,930,153 A | 5/1990 | Hagedorn |
| 5,117,451 A | 5/1992 | Ladd et al. |
| 5,369,695 A * | 11/1994 | Chakravarti et al. ........ 379/127 |
| 5,463,676 A | 10/1995 | Ohsawa |
| 5,966,660 A * | 10/1999 | Jonsson .................. 455/414 X |
| 6,038,293 A * | 3/2000 | McNerney et al. .. 379/88.16 X |

* cited by examiner

Primary Examiner—Creighton Smith

(57) ABSTRACT

The present invention relates to a call forwarding system for forwarding telephone calls to a target telephone not having a direct dial number. The call forwarding system includes an intelligent forwarding unit for storing a forwarding direct dial number and the extension number for accessing the target telephone and for connecting the received forwarded call to the target telephone, a voice response unit including a DTMF decoder for receiving the forwarded telephone call and for decoding the extension number of the target telephone. A call connecting unit directly connects the in-coming telephone call to the target telephone.

27 Claims, 3 Drawing Sheets

METHOD FOR FORWARDING A CALL TO A TELEPHONE BEHIND A KEY TELEPHONE SYSTEM

BACKGROUND OF THE INVENTION

1. Field of the Invention

This invention generally relates to a call forwarding system and, more particularly a call forwarding system for forwarding calls to a telephone not having its own direct dial number.

2. Description of the Prior Art

It is well known that a call forwarding system enables telephone calls directed to a particular telephone number to be redirected or forwarded to another telephone number. In particular, a user may program his or her telephone service such that any telephone call placed to the user's telephone number will automatically reroute to a forwarded number chosen by the user, thereby causing the telephone at the forwarded number to ring.

In one particular implementation of call forwarding, calls may be forwarded within a private telephone network controlled by a private branch exchange (PBX) type system, such as found in many office environments. For example, an employee may forward his calls to the telephone of another employee within the telephone network. Typically, this is accomplished by the user simply pressing the appropriate feature button on the telephone or entering the appropriate code on the dual tone multi-frequency (DTMF) numeric keypad on the telephone to activate the call forwarding feature and then entering the appropriate internal extension to which the call should be forwarded. As described above, once the call forwarding feature has been enabled, telephone calls intended for the user will ring at the forwarded number.

In a second implementation of call forwarding, the company PBX or central office (CO) switch enables users to forward calls to virtually any telephone number that the user can directly dial. For example, as mentioned above, the user enters the appropriate code on the DTMF pad on the telephone to activate the call forwarding feature. However, instead of entering the internal extension, the user enters the direct dial number for the telephone to which the call is to be forwarded. Therefore, telephone calls intended for the user will be automatically forwarded and ring at the forwarded directory number.

However, wall forwarding cannot be used for forwarding calls to telephones that are connected to the Public Switched Telephone Network (PSTN) through a Key Telephone System (KTS), Hybrid Telephone System (HTS) or Private Branch Exchange (PBX) not having direct inward dial (DID) numbers. Such telephones only have internal extensions but do not have their own direct dial numbers. Accordingly, calls may only be forwarded to the main switchboard number, whereupon the caller must speak to the receptionist or go through the private system's operator and request the called party by name or extension. Unfortunately, if the called party is not at at his or her own extension or if the caller does not know the name of the party being called, the receptionist has no way of forwarding the calls to the correct telephone number.

Therefore, there is a need for a call forwarding system wherein calls may proceed directly to a target telephone not having a direct dial number, without requiring the caller to interact with a receptionist or other similar function.

SUMMARY OF THE INVENTION

Briefly, the present invention relates to a call forwarding system for forwarding telephone calls to a target telephone not having a direct dial number. The call forwarding system includes an intelligent forwarding unit (IFU) for storing a forwarding direct dial number and extension number for accessing a target telephone and for connecting a forwarded call to a target telephone and a voice response unit having a DTMF tone detection unit for receiving the forwarded telephone call and for decoding the extension number of the target telephone.

A forwarding direct dial number and an extension number are provided by the user to the intelligent forwarding unit, which stores these numbers in a database or memory. When a telephone call is placed to the user's telephone number, the call forwarding system receives the call and automatically dials the forwarding direct dial number from its memory. The voice receiving unit, which is located at the forwarded direct dial number, then picks up the call and establishes a connection. The intelligent forwarding unit, upon detecting establishment of the call, passes the extension number to the voice response unit over the connection. The voice response unit, after receiving the extension number, places a call to the target telephone and connects it to the current call. The intelligent forwarding unit, upon detecting pickup of the call at the dialed extension, connects the forwarded call to the target telephone connected to the extension number. An ANI decoding unit may also be included to enable the system to determine the telephone numbers of the calling parties.

BRIEF DESCRIPTION OF THE DRAWINGS

Other features, object and advantages of the present invention will become readily apparent and understood upon consideration of the following detailed description and attached drawing, wherein.

DETAILED DESCRIPTION OF THE INVENTION

The present invention relates to a system for-enabling telephone calls to be forwarded to a target telephone not having direct in dial (DID) access, or its own direct dial number. Call forwarding is achieved to such a telephone by enabling the call forwarding system to pass an appropriate code to a call receiving unit, such as a voice response unit (VRU), which can then dial the extension of the target telephone. Upon successful completion of the call to the extension, a call connecting unit, is used to connect or bridge the calling party to the target telephone. Thus, an important aspect of the invention relates to the called non-DID site providing a direct telephone number to a VRU. The VRU is of the type that allows the caller to enter an extension number, wherein the VRU may then enable the non-DID system to transfer the call to the correct extension. The VRU used in the present invention is the type capable of answering telephone calls with a prerecorded message indicating that an extension is to be entered to reach the party of choice.

Another important aspect of the invention relates to the call forwarding site providing enhanced call forwarding features. The call forwarding system must be capable of accepting and storing the direct dial number of the VRU in addition to the extension number of the called party. Furthermore, the call forwarding system must be able to output the extension number only after the VRU has responded to the call and established a connection.

Figure 1:
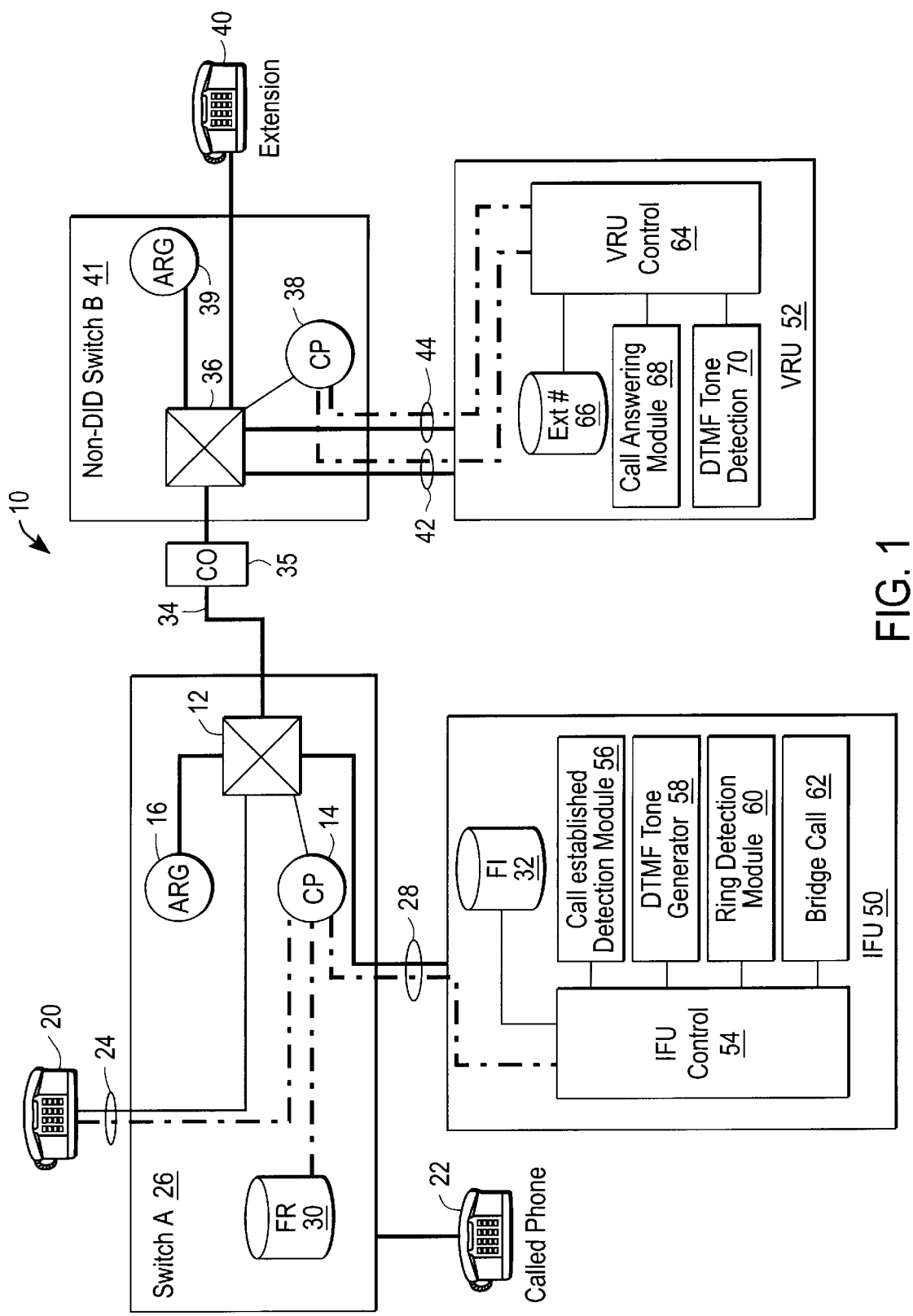
FIG. 1 is a block diagram of the call forwarding system in accordance with the present invention.

An exemplary embodiment of the call forwarding system in accordance with the present invention, generally identified with the reference 10, is illustrated in FIG. 1. Although a particular embodiment of a call forwarding system is shown, it should be understood by those skilled in the art that the principles of the present invention may be adapted to operate with various types of call forwarding systems other than that which is shown and described.

In a first embodiment of the invention, as shown in FIG. 1, the call forwarding system 10, as will be discussed in more detail below, includes an IFU 50, a call receiving unit such as a VRU 52, a telephone switch 26, which may be a PBX or a CO switch, and a non-DID capable switch 41. The telephone switch 26 is configured such that a call coming from a call originating telephone 20 directed to a called telephone 22 may instead be routed to a target telephone 40. Such a telephone may be an extension behind the non-DID switch 41, which lacks DID telephones. Both the telephone number of the VRU 52 and extension number of the target telephone 40 are provided to the switch 26 by the IFU 50.

Further referring to FIG. 1, the switch 26 includes an audible ring generator (ARG) 16 for providing a ringing tone to a caller during the call forwarding operation, a switching matrix 12 for establishing the call, a call processing unit 14 for directing the call to a particular destination, and a forwarding reference (FR) data base 30 for storing a flag for indicating whether the IFU 50 is to be responsible for forwarding the call from the telephone 20 to the target telephone 40.

The IFU 50 is responsible for forwarding and includes an IFU control unit 54 that controls the forwarding procedure. The IFU control unit 54 may be a microcontroller or a microprocessor. The IFU control unit 54 is connected to a forwarding information (F1) data base 32 which stores the telephone number to the VRU 52 and the extension of the target telephone 40. A dual tone multi-frequency tone generator 58 provides the DTMF tones required by the VRU 52. A "call established" detection module 56 determines whether the call is connected to the VRU 52. A ring detection module 60 determines whether the phone, once connected to the target telephone 40, is ringing. A bridge call unit 62 receives the call intended for the originally called telephone 22 and directly connects the call from the telephone 20 to the non-DID extension target telephone 40.

The detection module 56 operates in response to message registration signals it receives from the telephone network to determine whether a call has been established. In particular, these message registration signals, which are sent by the switch 26, indicate whether a call has been answered. Message registration signals for ISDN connections and local calls are known and disclosed in TIA/EIA464-B entitled "Requirements for Private Branch Exchange (PBX) switching equipment (ANSI/TIA/EIA464-B) (April 1996), hereby incorporated by reference. In particular, if the call forwarding system utilizes an ISDN connection to the public network, the PBX will receive a "connect" message from the public network when the target number is answered. The pertinent ISDN messages are specified in ANSI T1 607-1990 entitled "Integrated services Digital Network (ISDN) Layer 3 Signalling Specification for Circuit Service Bearer Service," and is hereby incorporated by reference. For local calls, the PBX will receive indications from the CO that the call has been answered, also in accordance with the TIA/EIA-464-B specification described above. However, if the call forwarding system is a non-ISDN type system, and is dialing long distance, the switch 26 must determine whether the remote extension has answered by monitoring the line and listening for ringing, busy, reorder or intercept tones in much the same manner as modems. In addition, registration signals may also be sent by the CO 35 in the case where the switch A 26 and the switch B 41 are connected through a CO 35.

The non-DID switch 41, like the DID switch 26, includes an ARG 39, a switching matrix 36, and a call processing unit 38. The non-DID switch 41 forms a temporary connection to the VRU 52 during call forwarding. The VRU 52 includes the VRU control unit 64, which may be a micro-controller or micro-processor, to control the functions of the VRU 52. The extension number data base 66 contains the extension number of the target telephone 40 that is to be dialed behind the non-DID switch 41. A call answering module 68 receives and answers the call from the IFU 50. A DTMF tone detection unit 70 decodes the DTMF tones provided by the IFU 50 to the VRU 52.

In operation, the telephone 20, which is connected to the switch 26 through line 24, may place a call to the called phone 22. The call processing unit 14 is informed of the incoming call and checks to determine whether the called telephone 22 has a forwarding reference flag set in the FR data base 30. For purposes of this discussion, it is to be assumed that a reference flag has been set to indicate that the IFU 50 is responsible for forwarding telephone calls.

Accordingly, upon activation of call forwarding, the CP 14 directs the control of the call to the IFU 50 through connection 28. The IFU controller 54 signals the CP 14 to connect the incoming call to the ARG 16 using the switching matrix 12, thereby providing a ring signal to the call coming from the telephone 20. The IFU controller 54 accesses the (F1) data base 32 using the number of the called telephone 22 as a key. This enables retrieval of the telephone number of the VRU 52 and the extension number of the target telephone 40, to which the call from the telephone 20 is to be directed. The IFU controller 54 signals the CP 14 to set up a new call from the IFU 50 to the VRU 52 telephone number. As mentioned above, the detection module 56 may be used to determine whether the call to the VRU 52 is answered.

The call answering module 68 answers the call to the VRU 52 and, after a short delay, when the detection module 56 has detected this, the detection module 56 commands the DTMF tone generator 58 to transmit the extension number of the target telephone 40, via DTMF tones over the connection 34, to the VRU 52. The VRU 52 DTMF tone detection unit 70 receives and decodes the extension number over a first line 42 and passes it to the VRU control unit 64. The VRU control unit 64 initiates an internal call to the extension with a received number on a second line 44 to the switch 41. The CP 38 and the switching matrix 36 are used to establish the call.

After the connection is established, the VRU control unit 64 instructs the CP 38 to bridge the internal call to the target telephone 40 to the call incoming from the switch 26. The ARG 39 in switch 41 provides audible ringing to the incoming call on connection 34. The IFU ring detection module 60 detects the audible ring on the connection 34 and signals the CP 14 to bridge the call on connection 34 to the call from the telephone 20.

After the call is connected and the extension 40 is bridged to the incoming call, the lines 42 and 44 are both dropped off the call. The voice path of the call from telephone 20 to the ARG 16 is also dropped. Furthermore, the IFU 50 signals the CP 14 to drop the line 28 out of the call. Thus, the calling telephone 20 is directly connected to the extension telephone 40.

In operation, for example, to enable call forwarding, the user picks up the handset and types in *72 on the DTMF keypad to activate the call forwarding feature of the system. The call forwarding system may then acknowledge its activation by transmitting a short audio signal back to the user. At that point, the user then keys in the direct dial number of the VRU to which the call is to be forwarded, followed by a pound (#) symbol to indicate the end of the entry and then enters the extension number of the non-DID target telephone, also followed by the # symbol. A short audio signal may once again be generated to acknowledge entry of the numbers.

Subsequently, the call forwarding system upon receiving a telephone call to the called phone 22, will connect the call coming from telephone 20 to the target telephone 40 at the intended extension in the manner described above. Thus, it can be seen that telephone calls may proceed directly to a target telephone not having a direct dial number, without requiring the caller to interact with a receptionist or other similar function.

Figure 2:
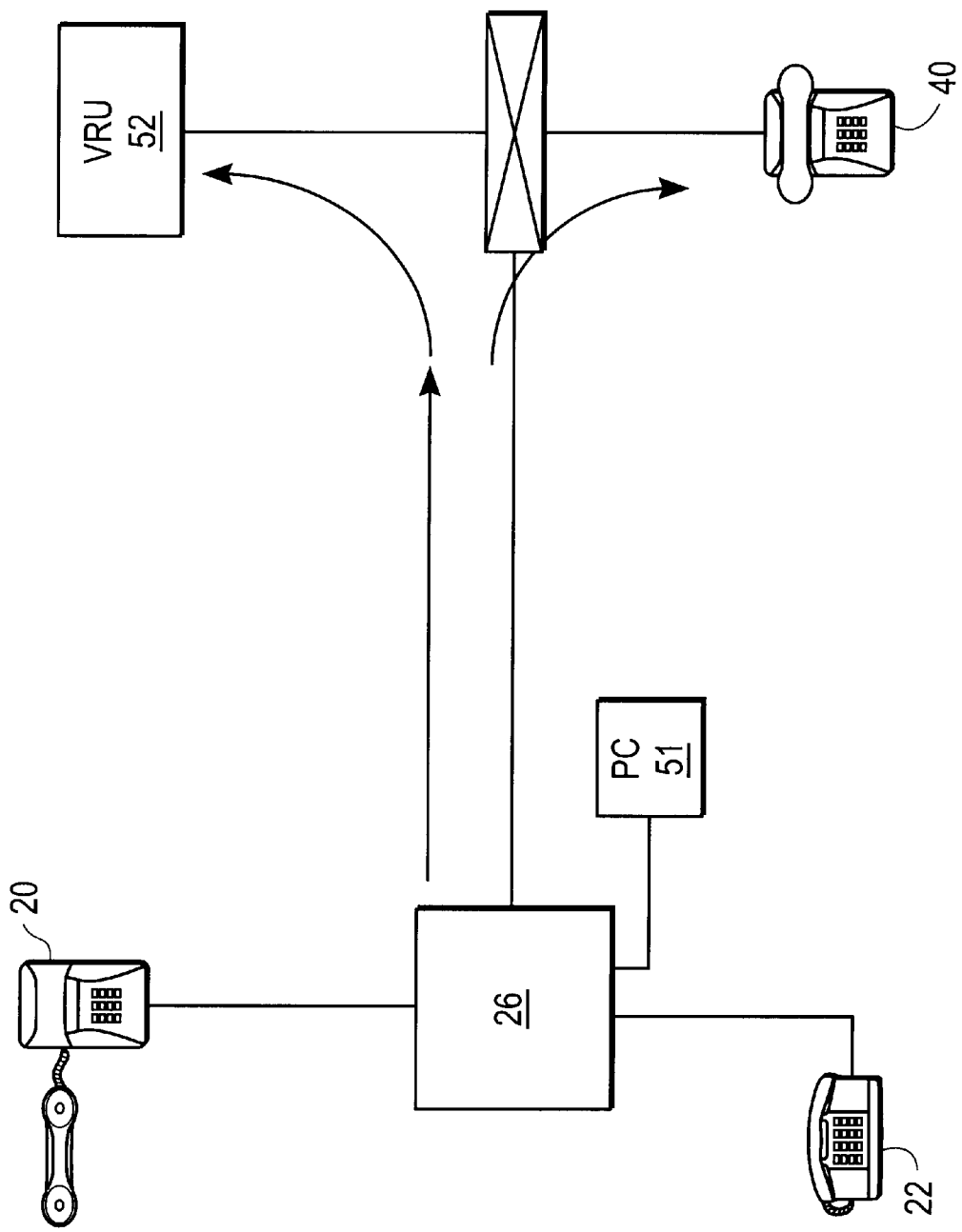
FIG. 2 is a block diagram of a second embodiment of the call forwarding system in accordance with the present invention.

Referring to FIG. 2, a second embodiment of the present invention is shown. In particular, a personal computer (PC) 51 is connected to the switch 26. The PC 51 controls call processing functionality through a telephone processing interface (not shown) or may contain the call processing functionality itself. Thus, many of the functions normally performed by a switch are accomplished by the PC 51. Using a PC 51 in such a fashion enables intelligent operation of the call forwarding system and allows a system designer to include added functionality and flexibility by adding features through software upgrades. In operation, the PC 51 picks up a call to the user's telephone, feeds ringing to the incoming call while calling the VRU 52 and outputs the extension number for the target telephone 40. Once the target telephone 40 answers the call, the computer 51 directs the switch 26 to connect the incoming call to the call made by the VRU 52. It is contemplated that in one implementation, the PC 50 is a module of the user's telephone itself in order to allow use of the existing telephone signaling capability.

Figure 3:
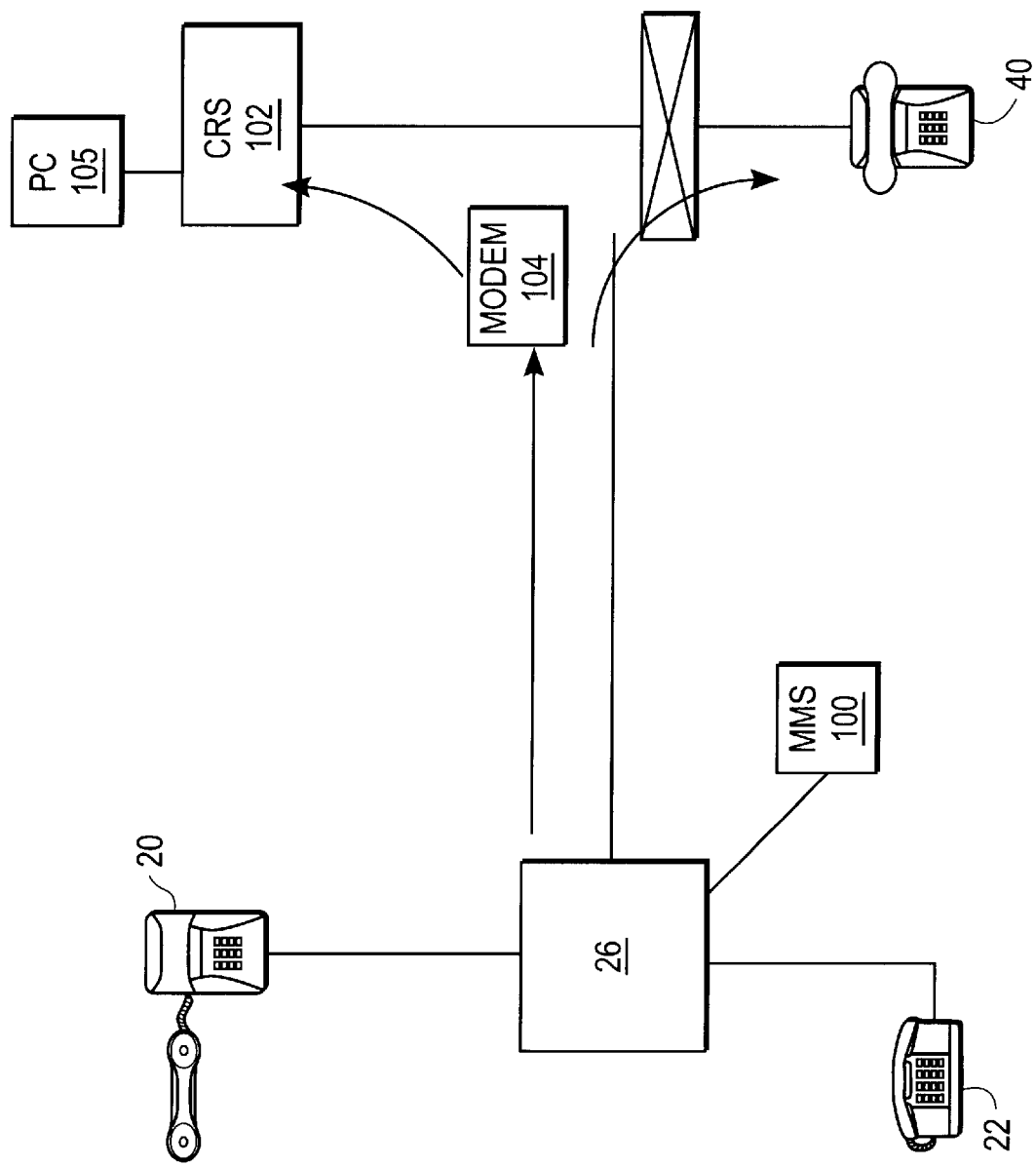
FIG. 3 is a block diagram of a third embodiment of the call forwarding system in accordance with the present invention.

Referring to FIG. 3, a third embodiment of the present invention is shown, wherein the system operates in a manner similar to that described in the first embodiment. However, in this third embodiment, data communications is performed through a modem 104. In particular, the switch 26 transfers calls to a Mobility Management Server (MMS) 100 connected to the switch 26 and the VRU 52 is replaced by a Call Routing Server (CRS) 102 which may include, or be attached to, an intelligent computing device, such as a computer 105. In addition, the modem 104 may optionally be integrated into the CRS 102. Thus, communication between the switch 26 and the CRS 102 is accomplished through the modem 104 using a predetermined defined control protocol or signalling function. It is to be noted that the modem 104 may optionally be replaced by an ISDN terminal adaptor to make use of ISDN signalling capabilities. Both the MMS 100 and CRS 102 may be also be intelligent computing devices, such as an IBM compatible PC. The MMS 100 in conjunction with the CRS 102 enables the party initiating call forwarding to enter unique identification information, such as the user's name instead of an actual extension number, to identify the location to where calls are to be forwarded.

In operation, an incoming call at the switch 26 is directed to the MMS 100. The MMS 100 upon receiving the forwarded call, sets up a call to the CRS 102 of the non-DID system. The MMS 100, after establishing the connection, then transmits an identification code such as an extension and/or name corresponding to the information entered by the user that was stored in the memory (not shown) of the MMS 100 to the CRS 102. The CRS 102 decodes the DTMF tone and cross-references the code to the extension intended by the user and dials the associated extension. The cross-referencing by the CRS 102 may be accomplished using a look-up table function wherein the code or name entered by the user is cross-checked against a pre-programmed list or database stored in the CRS 102 or PC 105 which contains extensions that correspond to the information entered by the user. Once the proper extension is identified, the CRS 102 causes the non-DID system to transfer the call to the correct extension. The MMS 100 then connects the incoming call to the extension.

An optional added feature of the described invention is the ability to detect automatic number identification (ANI) data provided by the CO. Thus, the call forwarding system may include an optional ANI decoding unit (not shown) to decode the caller's ANI information to determine the phone number of the calling party. Based on this information, the system can be programmed to enable the ANI decoding unit to answer calls originating from predetermined ANIs or have the ANI decoding unit block calls from other predetermined ANIs. Thus, this feature may be used to either authorize access to callers calling from only a certain telephone number, or to block nuisance callers from getting through. In addition, the ANI's can be stored for use by the system administrator as necessary.

What is claimed is:

1. A call forwarding system, comprising:
   a call forwarding unit to forward an in-coming telephone call to a target telephone having a predetermined extension number and no direct in-dial capability; and
   a call receiving unit having an assigned telephone number adapted to receive said forwarded telephone call and said extension number and forward said call to said target telephone to connect said in-coming telephone call to said target telephone; and
   a storage unit adapted to store said extension number and said call receiving unit number.

2. The call forwarding system of claim 1, wherein said storage unit is located in said call forwarding unit.

3. The call forwarding system of claim 1, wherein said call forwarding unit further includes a detection module to determine whether said in-coming call is connected to said call receiving unit.

4. The call forwarding system of claim 1, wherein said call forwarding unit further includes a tone generator for generating tones corresponding to said call receiving unit telephone number and said target telephone extension number.

5. The call forwarding system of claim 1, wherein said call forwarding unit further includes a ring detection unit to determine whether a telephone is ringing.

6. The call forwarding system of claim 1, wherein said call forwarding unit further includes a bridge call unit to connect said in-coming call to said target telephone.

7. The call forwarding system of claim 1, wherein said call forwarding unit further includes a call forwarding control unit to control operation of said call forwarding unit.

8. The call forwarding system of claim 1, wherein said call receiving unit further includes a call answering unit to answer said forwarded calls.

9. The call forwarding system of claim 1, further including an ANI identification unit for determining the telephone number of the in-coming telephone call.

10. The call forwarding system of claim 8, wherein said ANI identification unit will enable calls originating from a predetermined telephone number to be blocked.

11. The call forwarding system of claim 8, wherein said ANI identification unit will enable calls originating only from a predetermined telephone number to be allowed.

12. The call forwarding system of claim 1, wherein said call forwarding unit is an intelligent computing device.

13. The call forwarding system of claim 1, wherein said call forwarding unit is connected to an intelligent computing device.

14. A call forwarding system to enable in-coming calls from a caller to be forwarded to a target telephone having a predetermined extension number and no direct in-dial capability, comprising:
- a switch adapted to receive and forward an in-coming telephone call;
- storage adapted to store at least one predetermined code corresponding to said extension number of said target telephone;
- a mobility management server adapted to receive said forwarded in-coming telephone call and said at least one code; and
- a call routing server adapted to receive said forwarded telephone call and said at least one code from said mobility management server and to connect said received forwarded telephone call to said target telephone associated with said code.

15. The call forwarding system of claim 14, wherein said mobility management server is an intelligent computing device.

16. The call forwarding system of claim 14, wherein said call routing server is an intelligent computing device.

17. The call forwarding system of claim 14 wherein said call routing server includes a lookup table for determining an extension of the target telephone associated with said code.

18. The call forwarding system of claim 14, further including an ANI identification unit for determining the telephone number of the in-coming telephone call.

19. The call forwarding system of claim 18, wherein said ANI identification unit will block calls originating from a predetermined telephone number.

20. The call forwarding system of claim 18, wherein said ANI identification unit will allow calls originating only from a predetermined telephone number.

21. The call forwarding system of claim 14, wherein said target telephone has no direct in-dial capability.

22. The call forwarding system of claim 14, further including a communications device for enabling communications between said switch and said call routing server.

23. The call forwarding system of claim 22, wherein modem uses a predetermined protocol to communicate between said switch and said call routing server.

24. The call forwarding system of claim 14, wherein said call routing server includes a cross-reference table adapted to store an extension number corresponding said code.

25. The call forwarding system of claim 14, wherein said call routing server is an intelligent computing device.

26. The call forwarding system of claim 14, wherein said call routing server is connected to an intelligent computing device.

27. In a call forwarding system, a method for forwarding incoming calls to a target telephone not having a direct in-dial number, the method comprising:
- supplying to the system a telephone number and information that together identify the extension number of said target telephone;
- after said supplying step, receiving a telephone call;
- forwarding said telephone call and transmitting said identifying information; and
- receiving said forwarded telephone call and said identifying information and connecting said in-coming call to said target telephone.

* * * * *